United States Patent

Wakefield

[15] 3,676,396

[45] July 11, 1972

[54] STABILIZATION OF BUTADIENE-STYRENE RUBBERS

[72] Inventor: Lynn B. Wakefield, Akron, Ohio

[73] Assignee: Firestone Tire & Rubber Company, Akron, Ohio

[22] Filed: July 15, 1970

[21] Appl. No.: 55,257

[52] U.S. Cl. .................................. 260/45.9 R, 260/45.9 R
[51] Int. Cl. ........................................................ C08f 45/60
[58] Field of Search ................... 260/45.9, 33.6 UA, 33.6 A, 260/84.7; 252/401

[56] References Cited

UNITED STATES PATENTS

| | | | |
|---|---|---|---|
| 2,738,281 | 3/1956 | Chenicek et al. | 252/401 |
| 3,364,130 | 1/1968 | Barnum et al. | 252/401 |
| 2,829,121 | 4/1958 | Leeper | 260/45.9 |
| 3,281,383 | 10/1966 | Zelinski et al. | 260/23.7 |

Primary Examiner—Donald E. Czaja
Assistant Examiner—V. P. Hoke
Attorney—S. M. Clark and Gordon B. Seward

[57] ABSTRACT

Polyalkylenepolyamines are used as stabilizers for solution-polymerized butadiene-styrene rubbers.

3 Claims, No Drawings

STABILIZATION OF BUTADIENE-STYRENE RUBBERS

This invention relates to a stabilizer for rubbers including homopolymers of conjugated dienes of four to six carbon atoms and copolymers thereof, and copolymers of such conjugated dienes with styrene or methylstyrene. The invention relates more particularly to the stabilization of solution-polymerized copolymers of butadiene with styrene or methylstyrene. The butadiene and styrene or methylstyrene are used in the ratio of from 60 to 85 percent butadiene to 40 to 15 percent styrene or methylstyrene. Such copolymer may be prepared by emulsion polymerization or by solution polymerization.

The stabilizer is ethylene diamine or an alkylene polyamine of the formula:

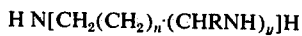

$$H\,N[CH_2(CH_2)_n\cdot(CHRNH)_y]H$$

in which R is hydrogen or an alkyl group of one to five carbon atoms, $n$ is 0 or 1, and $y$ is any whole number from 1 to 10. Such compounds include, for example:

Ethylene diamine
Diethylenetriamine
Triethylenetetraamine
Tetraethylenepentamine, etc. up to and including decaethyleneundecamine
1,3-Butanediamine
1,2-Propanediamine
Dipropylenetriamine
Tripropylenetetramine The foregoing compounds are named to include straight- and branched-chain alkylene groups.

The polyamines are incorporated in the polymer, usually before drying or separation of solvent in which the polymer is prepared, and it is surprising that even the lower boiling polyalkylenepolyamines, including ethylenediamine, are highly effective. The compounds may be used in their commercially pure form or as mixtures. Thus, in the preparation of the commercial lower molecular weight compounds, usually a higher molecular weight residue which is a mixture of compounds, is prepared. Such a mixture which is composed largely of hexaethylene heptamine, heptaethylene octamine, octaethylene nonamine, nonaethylene decamine and decaethylene undecamine, is known as Polyamine H SPECIAL marketed by Union Carbide Company.

Polymer stabilizers have been used in practice to protect the polymer during separation of solvent and drying, and in storage. Unless such stabilizer is employed the polymer becomes degraded and the Mooney drops, and the polymer may even become soupy or, on the other hand, cross-linking may take place and gel may form, causing a rise in the Mooney. In either case the material loses commercial value. Commercial antioxidants have been applied to such solution and emulsion polymers but have been found to be of limited effectiveness.

A commercial polyalkylenepolyamine (Polyamine H SPECIAL, Union Carbide) has been incorporated in butadiene-styrene rubber copolymer, usually after the addition of a polymer stabilizer to prevent the production of fines during the coagulation of polymer produced in emulsion. There has been no recognition of polyalkylenepolyamine having any stabilizing effect whatever on the polymer. In fact, a specific study on this point has indicated that, if anything, the presence of Polyamine H SPECIAL may lead to a stiffening of the emulsion styrene-butadiene rubbers in oven aging. Thus, when two samples of emulsion SBR polymerized at 41° F. were oil extended with 37.5 parts of Shell Dutrex 726, with one containing 0.5 part per hundred (phr) of Polyamine H SPECIAL and the other containing no added antioxidant, and the resulting polymers were oven aged at 75° C., the results shown below were obtained:

| Stabilizer | phr | Mooney | Change in Mooney* | | |
|---|---|---|---|---|---|
| Polyamine H SPECIAL | 0.5 | 101% 67 ML4 | 114% 4 Days 102% | 8 Days 101% |
| No stabilizer | 0.0 | 68 | | |

*Per cent of original Mooney.

These data indicate that in an emulsion-polymerized SBR, under these conditions of oven aging, without any antioxidant at all there is no significant change in Mooney viscosity during the aging period; with Polyamine H SPECIAL, there is a small stiffening. That is, in emulsion SBR, Polyamine H SPECIAL shows no particular stabilizing effect, so that there would be no reason to expect it to be of value in a solution-polymerized styrene-butadiene rubber.

The invention, which relates to solution-polymerized styrene-butadiene (60–85/40–15) rubbery copolymer, is further described in connection with the following examples. The tests were conducted with solution-polymerized butadiene-styrene copolymers to which a highly aromatic oil (Dutrex 726) had been added in the ratio of 37.5 parts oil to 100 parts polymer, as in the foregoing comparative example.

In plant practice, the stabilizer is always added to the cement (solution) of the polymer obtained as the product of the polymerization if conducted in a solvent, and in the latex of the polymer produced in emulsion polymerization. If an extending oil is employed it is customarily added to the cement or latex. Then, if the polymer is present in a cement, the solvent is usually removed in a drum drier or by water desolventization. If the polymer is present in a latex, the latex is coagulated by the addition of salt or acid. In both cases the stabilizer is intimately incorporated in the polymer product.

In the laboratory, drum drying and desolventization are simulated, and the polymer is substantially identical with that obtained from cement in the plant. Polymer latexes are treated in the laboratory in a manner closely simulating plant treatment, and the product obtained is substantially the same as that obtained in the plant.

The effectiveness of the various stabilizers of this invention in inhibiting degradation of the polymer was determined by noting the change in the viscosity and comparing this with the effectiveness of Santoflex 13 (an N-alkyl-N'-aryl p-phenylenediamine), marketed by Monsanto Co. and frequently used commercially for the stabilization of butadiene-styrene copolymer. The determinations of viscosity were measured in a Mooney plastomer, and recorded as ML/4/212.

The data was obtained at different times, using comparable procedures of water desolventization, and are brought together in the following table in which the stabilizers are identified as follows:

Stabilizer A = Diethylene Triamine
Stabilizer B = Polyamine H SPECIAL
Stabilizer C = 1,3-Butane Diamine
Stabilizer D = 1,2-Propane Diamine
Stabilizer E = Ethylene Diamine The control was a mixture of 50:50 Santoflex 13 and oleic acid.

The samples were aged by exposing them in a circulating-air oven at 75° C. for 4 and 8 days, respectively. The original or unaged Mooney is recorded for each sample followed by the percentage of the original Mooney retained after oven aging for 4 and 8 days. The amount of stabilizer is recorded in Parts per Hundred of Polymer (p.h.r.).

| Sample | P.h.r. | Original Mooney | % Retained Mooney 4 Days | 8 Days |
|---|---|---|---|---|
| Control | 1.0 | 43 | 59 | 61 |
|  | 1.0 | 45 | 77 | 66 |
| A | 0.50 | 51 | 97 | 98 |
| A | 0.25 | 51 | 93 | 92 |
| A | 0.10 | 49 | 99 | 91 |
| B | 0.50 | 45 | 95 | 92 |
| B | 0.25 | 47 | 102 | 100 |
| B | 0.10 | 47 | 101 | 100 |
| C | 0.25 | 49 | 91 | 87 |
| D | 0.50 | 55 | 87 | 77 |
| E | 0.50 | 51 | 93 | 92 |

I claim:

1. Solution-polymerized butadiene-styrene rubber copolymer (60–85/40–15) stabilized with a stabilizing amount of at least one alkylene-polyamine of the formula:

$$H_2N[CH_2(CH_2)_n\cdot(CHRNH)_y]H$$

in which R is hydrogen or an alkyl group of one to five carbon atoms, $n$ is 0 or 1, and $y$ is any whole number from 1 to 10.

2. The composition of claim 1 in which the copolymer is oil extended.

3. The composition of claim 1 in which the stabilizer is a mixture of hexaethylene heptamine, heptaethylene octamine, octaethylene nonamine, nonaethylene decamine and decaethylene undecamine.

* * * * *